Patented May 23, 1933

1,910,692

UNITED STATES PATENT OFFICE

IVAN GUBELMANN AND JOHN M. TINKER, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

PROCESS FOR PREPARING BETA-AMINO-ANTHRAQUINONES

No Drawing. Application filed June 13, 1930. Serial No. 461,043.

This invention relates to the preparation of beta-amino-anthraquinone and more particularly to an improvement in the process of manufacturing this compound by treating a beta-anthraquinone-sulfonic acid compound with ammonia.

Beta-amino-anthraquinone is a commercially important product in that it is a very valuable intermediate for the preparation of certain dyestuffs. Its value in this regard, however, is often directly dependent upon its state of purity.

Of the methods for making beta-amino-anthraquinone, that involving the replacement of the sulfo group in beta-anthraquinone-sulfonic acid by means of ammonia has found the greatest commercial application. Various modifications of this general process have been devised in an attempt to produce a high grade beta-amino-anthraquinone in a commercially feasible manner.

The following specific modifications of said general method are disclosed in the literature; the treatment of beta-anthraquinone-sulfonic acid with aqueous ammonia under high temperature and pressure, without the addition of any other substances thereto; a similar treatment of the beta-anthraquinone-sulfonic acid but in the presence of oxidizing agents such as sodium bichromate, potassium chromate, manganese dioxide, cuprous or cupric oxide, arsenic oxide, silver oxide, copper sulfate and potassium bromate; the heating of beta-anthraquinone-sulfonic acid with ammonia under pressure as above but in the presence of inorganic salts such as barium, calcium and magnesium salts; and a treatment of beta-anthraquinone-sulfonic acid under pressure with ammonia as disclosed above but in the presence of aryl-nitro compounds such as nitro-benzene, nitro-toluene, nitro-naphthalene, or their sulfonic acids and salts.

Each of these processes, however, possess certain objectionable features which reduce its desirability and efficiency for commercial application. Thus, the methods wherein no oxidizing agents are employed generally give very poor yields, usually reported to be about 19 to 45% of theory. On the other hand, when processes involving the use of the copper oxides or manganese dioxide are employed, the separation of the end product from any residual quantities of these substances in the reaction mixture entails a very difficult operation. The use of arsenic oxide moreover requires a laborious and expensive method for the recovery of the arsenic or else presents a serious problem of disposing of the arsenic poisoned waste liquors. The process involving the use of nitro-aryl compounds produces various organic by-products from which the recovery of the beta-amino-anthraquinone in a pure state is exceedingly difficult.

We have now found that if beta-anthraquinone-sulfonic acid, or a salt thereof, be treated with aqueous ammonia at elevated temperatures, under pressure, and in the presence of an oxidizing agent, but under such conditions as to avoid the presence of an excess of oxidizing agent at any given instant, beta-amino-anthraquinone is obtained not only in high yield but in an exceptional state of purity as compared to hitherto known methods. With this process, moreover, it is merely necessary to filter the solid beta-amino-anthraquinone produced therein from the reaction liquors, to obtain a product highly adapted for direct use as an intermediate in the preparation of various dyestuffs, such for example as indanthrone or flavanthrone.

It is accordingly an object of this invention to provide a process for producing beta-amino-anthraquinone in good yields and in a high state of purity.

It is a further important object of this invention to provide a process for preparing beta-amino-anthraquinone that is highly economical, simple, readily controllable and requires no special degree of skill on the part of the operator to carry it to completion.

It is a further important object of this invention to provide a process for producing beta-amino-anthraquinone in good yields and in a high state of purity by heating beta-anthraquinone-sulfonic acid and ammonia to their reaction temperature and slowly adding an oxidizing agent to the reaction mixture.

It is a further important object of this invention to provide a process for preparing beta-amino-anthraquinone of great purity and in good yields by heating together beta-anthraquinone-sulfonic acid and ammonia to effect a reaction therebetween and then adding an oxidizing agent to the reaction mixture at a rate commensurate with the rate of formation of sulfurous acid in said mixture.

Other and further important objects of this invention will become apparent from the following description and appended claims.

Our method consists briefly in charging anthraquinone-beta-sulfonic acid or its salts into an autoclave containing an excess of aqueous ammonia, and heating the mass to the preferred reaction temperature which is generally around 160 to 210° C. We then gradually introduce a solution or suspension of an oxidizing agent into the reaction mass, at a rate comparable to the rate of reaction. Another way of expressing this is to say that we add the oxidizing agent at a rate not substantially higher than the rate of formation of sulfurous acid. The rate of reaction varies with the temperature and pressure. At the higher temperatures the amidation may be completed in 5 to 6 hours. The lower temperatures may require as long a treatment period as 24 hours. We therefore regulate the supply of oxidizing agent so that just about the theoretically requisite quantity (one equivalent per mol of beta-anthraquinone-sulfonic acid) is fed in during the reaction period. For best results, the oxidizing agent should be fed in at such a rate that a sample of the reaction mixture at any stage except at the very end should contain some leuco derivatives of anthraquinone, but at no stage should it contain reduction derivatives lower than leuco.

For the purpose of facilitating feeding the oxidizing agent into the high pressure autoclave, we prefer to use the same in the form of a solution or suspension in a liquid. For the further purpose of facilitating the separation of the final product from the oxidizing agent, we prefer to use a water soluble oxidizing agent, for instance, sodium, potassium or ammonium chlorate or bromate. Nitro-benzene, its sulfonic acids or their salts may also be added if desired or expedient, as the disadvantages arising from the use of these substances in the processes pointed out above, are overcome in this process because of the fact that a high concentration of these compounds is never present in the reaction mixture.

The following example in which parts by weight are given serves more fully to illustrate our invention.

*Example*

310 parts of the sodium salt of anthraquinone-beta-sulfonic acid are charged into an autoclave containing 2000 parts of 25% aqueous ammonia (250 gm. per liter). The autoclave is closed and brought to a temperature of about 175° C. within a period of 3 to 4 hours, and maintained at this temperature for another 3 hours. The pressure at this point is about 580 pounds per square inch. A solution of 50 parts of sodium chlorate in 300 parts of 25% aqueous ammonia is then slowly introduced into the vessel at such a rate that it is all added in a period of about 15 to 18 hours, the temperature being maintained at about 175° C. The mass is held at this temperature for an additional two hours and then cooled to room temperature. The autoclave is now opened and sufficient water added to bring the total volume to that corresponding to about 6000 parts by weight. 70 parts of caustic soda are next added and the resulting mass heated until free of ammonia. The hot suspension is filtered and washed with water. The beta-amino-anthraquinone thus obtained is in substantially pure form, and when dry is a reddish orange powder melting at about 306 to 308° C. The yield is over 80% of theory.

It will, of course, be understood that this process may be varied within wide limits, without departing from the spirit of our invention. Thus, the temperature of the reaction may range anywhere from 160 to 210° C. Further, the concentration of the ammonia may be varied from 10 to 35%, using correspondingly lower or higher pressures. Similarly, instead of using precisely 1 equivalent of oxidizing agent per mol of beta-anthraquinone-sulfonic acid, an excess or deficiency of the same may be employed, for instance, 0.75 to 2.00 equivalents per mol of the anthraquinone compound. In the case of an excess, however, the best results will not be obtained unless care is taken to prevent the excess from being present in the mixture until most of the beta-anthraquinone-sulfonic acid has been converted over into the amino compound. Again, the duration of the heating may vary from 5 hours or less to 24 hours or more. The addition of the oxidizing agent, moreover, may be extended over the entire reaction period or only over a major portion thereof. As pointed out, however, better results are obtained with the slower rates of addition of said oxidizing agent.

Instead of the sodium salt of anthraquinone-beta-sulfonic acid, other water soluble salts of the same may be used, as well as the free acid. It is advantageous, however, to employ either the free acid, or such salts as do not form insoluble sulfates, chlorides, or hydroxides, for in such a case, the resultant beta-amino-anthraquinone is obtained free of inorganic impurities. In the claims below, the term "a beta-anthraquinone-sulfonic acid compound", should be understood to refer to beta-anthraquinone-sulfonic acid or its water-soluble salts; the term "alkali-metal salt"

should be understood as comprising the sodium, potassium or ammonium salts.

We claim as our invention:

1. In the process of preparing beta-aminoanthraquinone by treating a beta-anthraquinone-sulfonic acid compound with ammonia, the steps which comprise first bringing a mixture of these reactants to the reaction temperature and pressure and then adding an oxidizing agent thereto.

2. In the process of preparing beta-aminoanthraquinone by treating a beta-anthraquinone-sulfonic acid compound with ammonia, the steps which comprise heating a mixture of these reactants under pressure to the reaction temperature, permitting the reaction to proceed for some time, and then adding an oxidizing agent to the reaction mass.

3. In the process of preparing beta-aminoanthraquinone by treating a beta-anthraquinone-sulfonic acid compound with ammonia, the step which comprises adding an oxidizing agent to the reaction mixture while the same is under reactive conditions at a rate insufficient to prevent the formation within the mixture of anthraquinone leuco compounds but sufficient to prevent the formation of reduction products lower than the leuco during the major portion of the reaction period.

4. In the process of preparing beta-aminoanthraquinone by treating a beta-anthraquinone-sulfonic acid compound with ammonia, the step which comprises adding an oxidizing agent to the reaction mixture at a rate not substantially higher than the rate of formation of sulfurous acid compounds therein.

5. The process of preparing beta-aminoanthraquinone which comprises slowly heating a mixture of an alkali metal salt of anthraquinone-beta-sulfonic acid and an aqueous solution of ammonia to about 175° C. in an autoclave, maintaining this temperature for about three to four hours and then gradually adding a solution of an alkali metal chlorate over a prolonged period while maintaining said temperature of 175° C. in the autoclave.

6. In the process of preparing beta-aminoanthraquinone by treating a beta-anthraquinone-sulfonic acid compound with aqueous ammonia, the steps which comprise first bringing a mixture of these reactants to the reaction temperature and pressure and then adding an oxidizing agent thereto.

7. In the process of preparing beta-aminoanthraquinone by treating a beta-anthraquinone-sulfonic acid compound with aqueous ammonia, the steps which comprise heating a mixture of these reactants under pressure to the reaction temperature, permitting the reaction to proceed for some time, and then adding an oxidizing agent to the reaction mass.

8. In the process of preparing beta-aminoanthraquinone by treating a beta-anthraquinone-sulfonic acid compound with an aqueous solution of ammonia, the step which comprises adding an oxidizing agent to the reaction mixture while the same is under reactive conditions at a rate insufficient to prevent the formation within the mixture of anthraquinone leuco compounds but sufficient to prevent the formation of reduction products lower than the leuco during the major portion of the reaction period.

9. In the process of preparing beta-aminoanthraquinone by treating a beta-anthraquinone-sulfonic acid compound with an excess of an aqueous ammoniacal solution, the step which comprises adding an oxidizing agent to the reaction mixture at a rate not substantially higher than the rate of formation of sulfurous acid compounds therein.

In testimony whereof we have hereunto subscribed our names at Carrollville, Milwaukee County, Wisconsin.

IVAN GUBELMANN.
JOHN M. TINKER.